United States Patent [19]

Utsumi

[11] Patent Number: 5,418,075

[45] Date of Patent: May 23, 1995

[54] THERMAL TRANSFER FOIL AND A METHOD OF FORMING A PHOSPHOR SCREEN BY USING THERMAL TRANSFER FOIL

[75] Inventor: Ichiro Utsumi, Kanagawa, Japan

[73] Assignee: Sony Corporation, Tokyo, Japan

[21] Appl. No.: 19,644

[22] Filed: Feb. 18, 1993

[30] Foreign Application Priority Data

Feb. 24, 1992 [JP] Japan .................................. 4-036672

[51] Int. Cl.[6] .............................................. B32B 9/00
[52] U.S. Cl. ..................................... 428/690; 428/200;
428/209; 428/352; 428/354; 428/461; 428/483;
428/913; 428/914
[58] Field of Search .............. 428/210, 457, 704, 53.9,
428/5, 690, 200, 209, 352, 354, 461, 483, 690,
913, 914; 156/230, 233.7, 241; 427/68, 69

[56] References Cited

U.S. PATENT DOCUMENTS 3,839,068 10/1974 Miura .................................. 427/68
3,910,806 10/1975 Schwartz ............................ 156/230
4,209,551 6/1980 Masaki et al. ....................... 427/68

OTHER PUBLICATIONS

Chemical Abstract CA120(2):18772J CA Nakamura, Oct. 15, 1991.

Primary Examiner—Patrick J. Ryan
Assistant Examiner—William A. Krynski
Attorney, Agent, or Firm—Jay H. Maioli

[57] ABSTRACT

On a long base film (7) made of polyethylene terephthalate, there are formed a stripping layer (8), an aluminum layer (9), a phosphor layer (10) and a bonding layer (11) to construct a thermal transfer foil (P). A phosphor screen is formed on a glass panel by using the thermal transfer foil (P). In the process for forming a phosphor layer of a cathode ray tube, the number of manufacturing processes can be reduced so that a manufacturing cost of the phosphor screen can be reduced. Also, there can be obtained a stable phosphor screen having a constant film thickness.

15 Claims, 4 Drawing Sheets

FIG. 1A
FIG. 1B
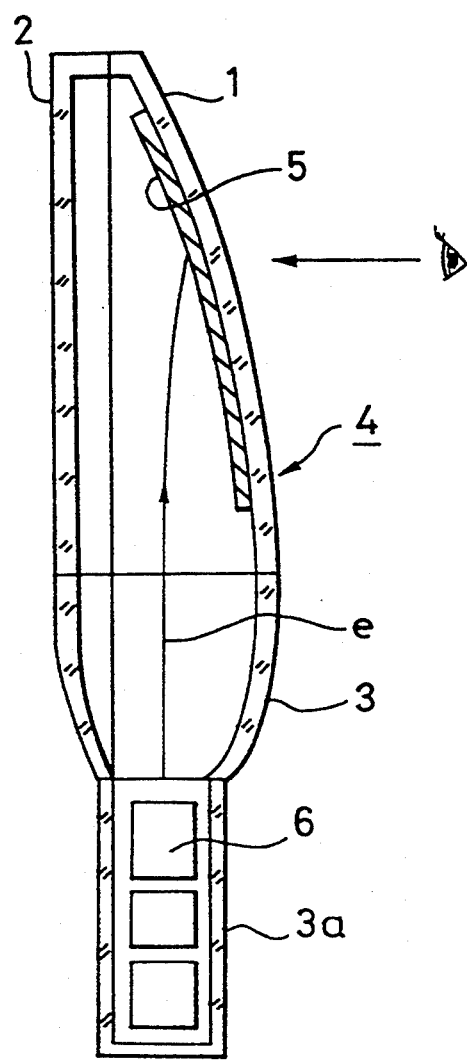
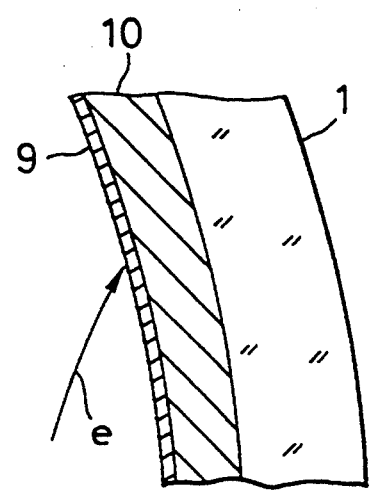

THERMAL TRANSFER FOIL AND A METHOD OF FORMING A PHOSPHOR SCREEN BY USING THERMAL TRANSFER FOIL

BACKGROUND OF THE INVENTION

1. Field of the Invention

The present invention relates to a thermal transfer foil and a method of forming a phosphor screen by using a thermal transfer foil for use in cathode ray tubes such as transmissive type flat cathode ray tubes in which a phosphor screen is formed on a screen panel side.

2. Description of the Prior Art

There is known a reflection type flat cathode ray tube whose flat glass tubes envelope is formed of a triple comprising a screen panel, a front panel and a funnel portion having a neck portion. That is, the flat glass tube envelope comprises the screen panel and the front panel that are bonded by frit glass in an opposing relation so as to form a flat space therebetween, a funnel portion bonded and sealed on one side of the screen panel and the front panel similarly by frit glass and the neck portion welded to the funnel portion at the funnel portion's small diameter open end. An electron gun is disposed within the neck portion.

On the inner surface of the screen panel, there is deposited a phosphor screen through a reflection film made by vapor deposition of aluminum material or the like. An electron beam emitted from the electron gun is scanned on the phosphor screen in the horizontal and vertical directions. An optical image that is excited and rendered luminous by the electron beam can be viewed by the viewer from the front panel side opposing the screen panel.

Recently, there has been developed a transmissive type flat cathode ray tube having a triple structure that comprises a screen panel, a back panel and a funnel portion having a neck portion.

In this case, a phosphor layer is formed on the inner surface of the screen panel and an aluminum layer must be further formed on the phosphor layer as a metal-backing layer. The reason for this is that a high voltage is applied to the phosphor screen and brightness and contrast must be improved.

As a method of forming such phosphor screen, a phosphor layer is formed by a slurry method or electro-deposition method, an acrylic resin layer is formed on the phosphor layer by a lacquer method as an intermediate layer and an aluminum layer is formed on this acrylic resin layer by a vacuum evaporation method.

This method, however, requires much more processing, thus the manufacturing cost of the phosphor screen cannot be reduced substantially. Also, the film thickness of the phosphor screen cannot be kept constant.

Furthermore, the aforesaid conventional method needs the intermediate layer. There is then the disadvantage that the aluminum layer may be stripped in the baking process or that a satisfactory mirror surface cannot be obtained.

OBJECTS AND SUMMARY OF THE INVENTION

Therefore, it is an object of the present invention to provide an improved thermal transfer foil and a method of forming a phosphor screen by using the thermal transfer foil in which the aforesaid shortcomings and disadvantages encountered with the prior art can be eliminated.

More specifically, it is an object of the present invention to provide a thermal transfer foil and a method of forming a phosphor screen of a cathode ray tube in which the number of processes can be reduced to thereby reduce the manufacturing cost of the phosphor screen.

It is another object of the present invention to provide a thermal transfer foil and a method of forming a phosphor screen in which a stabilized phosphor screen having a constant film thickness can be obtained.

According to a first aspect of the present invention, there is provided a thermal transfer foil which comprises a base film having a stripping property, a stripping layer serving as a transfer layer, a metal-backing layer, a phosphor layer, and a bonding layer, wherein the stripping layer, the metal-backing layer, the phosphor layer and the bonding layer are formed on said base film, in that order.

According to a second aspect of the present invention, there is provided a method of forming a phosphor screen which comprises the steps of urging a bonding layer of a thermal transfer foil against a glass substrate, transferring a transfer layer on the glass substrate by pressing and heating the thermal transfer foil, and baking a product at a predetermined temperature.

When the phosphor screen is formed on the glass substrate by the thermal transfer method using the thermal transfer foil of the present invention, the phosphor layer and the metal-backing layer can be formed at the same time. In this case, according to the present invention, even when the intermediate layer is not formed between the phosphor layer and the metal-backing layer, the film thickness of the phosphor screen can be kept constant. Furthermore, the phosphor layer of the thermal transfer foil can be formed with ease by suitable printing methods such as screen process printing or the like.

The above and other objects, features, and advantages of the present invention will become apparent from the following detailed description of illustrative embodiments thereof, to be read in conjunction with the accompanying drawings, in which like reference numerals are used to identify the same or similar parts in the several views.

BRIEF DESCRIPTION OF THE DRAWINGS

FIG. 1A is a cross-sectional view showing an overall arrangement of a transmissive type flat cathode ray tube to which an embodiment of the present invention is applied;

FIG. 1B is a cross-sectional view showing a main portion of the transmissive type flat cathode ray tube shown in FIG. 1A;

DETAILED DESCRIPTION OF THE PREFERRED EMBODIMENTS

Figure 2:
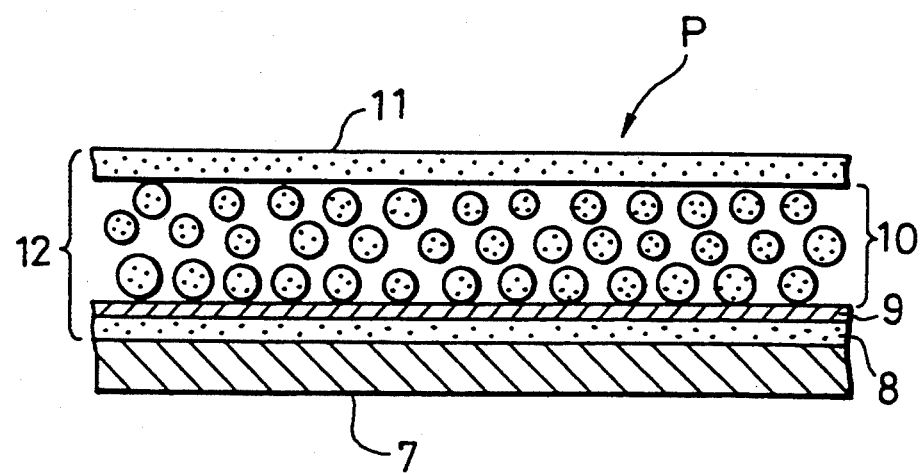
FIG. 2 is a cross-sectional view showing a thermal transfer foil according to an embodiment of the present invention.

A thermal transfer foil and a method of forming a phosphor screen according to the embodiments of the present invention will hereinafter be described with reference to the drawings.

FIG. 1A is a cross-sectional view showing an overall arrangement of a transmissive type flat cathode ray tube to which an embodiment of the present invention can be applied.

As shown in FIG. 1A, this cathode ray tube includes a flat glass tube envelope having a triple structure formed of a screen panel 1, a back panel 2 and a funnel portion 3 having a neck portion 3a. Each of the screen panel 1 and the back panel 2 is made of a transparent glass.

The screen panel 1 is formed flat in the horizontal direction and is formed as a curved surface having a predetermined curvature in the vertical direction. The screen panel 1, the back panel 2 and the funnel portion 3 are fixedly bonded by means of a frit seal.

On the inner surface of the screen panel 1, there is formed a phosphor screen 5 by a method which will be described later on. As shown in FIG. 1B, a phosphor layer 10 is formed on the glass inner surface of the screen panel 1 and an aluminum layer 9 is formed on the phosphor layer 10. The phosphor is of the type that a black and white picture can be displayed. The aluminum layer 9 is used to apply a high voltage and serves as a metal-backing layer for increasing brightness; and contrast.

As shown in FIG. 1A, an electron gun 6 is disposed within the neck portion 3a of the funnel portion 3. An electron beam emitted from the electron gun 6 is introduced to impinge on the phosphor screen 5 in the horizontal and vertical directions, whereby an optical image is formed on the screen panel 1.

A thermal transfer foil that is used to manufacture the above-mentioned cathode ray tube according to an embodiment of the present invention will be described below.

FIG. 2 is a cross-sectional view showing the structure of a thermal transfer foil P according to an embodiment of the present invention.

As shown in FIG. 2, on a long base film 7 made of polyethylene terephthalate, for example, there are formed a stripping layer 8, an aluminum layer 9, a phosphor layer 10 and a bonding layer 11, in that order. The thickness of the stripping layer is approximately 1 μm, the thickness of the aluminum layer 9 is several hundred Å, the thickness of the phosphor layer 19 falls in a range of from 50 μm to 100 μm and the thickness of the bonding layer 11 is about 1 μm.

Figure 3:
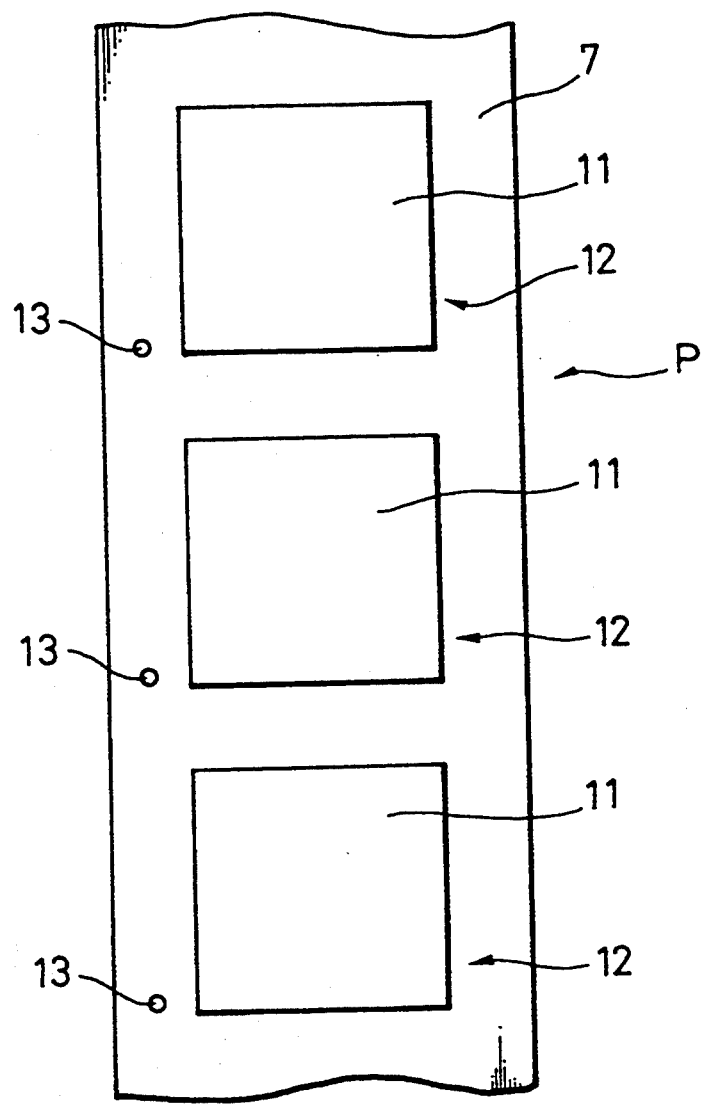
FIG. 3 is a plan view showing the thermal transfer foil according to an embodiment of the present invention.

As shown in FIG. 3, the thermal transfer foil P is formed such that a plurality of thermal transfer layers 12 in which the aforesaid respective layers are laminated with the bonding layer 11 serving as the uppermost layer, are formed on the long base film 7. Thus, continuous thermal transfer becomes possible. In the vicinity of the respective thermal transfer layers 12, there are provided positioning means 13 such as marks or the like.

The thermal transfer foil P is manufactured as follows.

At a predetermined position on the base film 7, there is formed the stripping layer 8 by using an ink made of the following composition 1 according to a gravure printing method. Then, the aluminum layer 9 is formed on the stripping layer 8 by the evaporation process. The phosphor layer 10 is formed on the aluminum layer 9 by using a phosphor paste made of the following composition 2 according to a screen process printing method. Finally, the bonding layer 11 is formed on the phosphor layer 10 by using an ink made of the following composition 3.

|  | parts by weight |
| --- | --- |
| Composition 1 | |
| acrylic resin | 10 |
| toluene | 45 |
| methylethyl ketone | 45 |
| Composition 2 | |
| acrylic resin | 20 |
| phosphor powder (Y$_3$O$_6$S:Eu) | 20 |
| isophorone | 10 |
| cyclohexanone | 50 |
| Composition 3 | |
| polyamide resin | 30 |
| ethyl cellosolve | 30 |
| cyclohexanone | 40 |

The above-mentioned processes for forming the respective layers on the base film can be carried out by the continuous printing process. There is then the advantage such that the number of processes can be reduced considerably as compared with the prior art in which similar processes are required for each glass surface.

A method of forming the phosphor screen 5 by using the thermal transfer foil P will be described below.

Figure 4A:
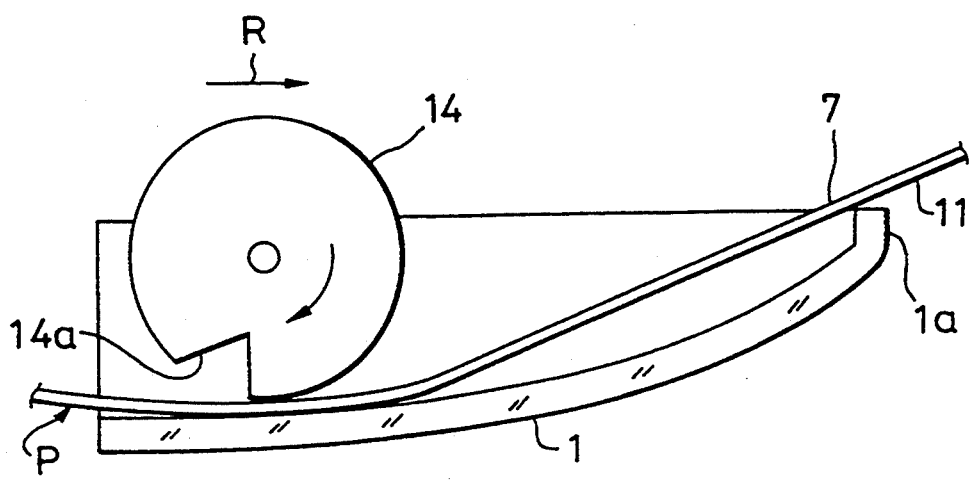
FIGS. 4A and 4B are diagrams used to explain a method of forming a phosphor screen according to the embodiment of an present invention, respectively.
Figure 4B:
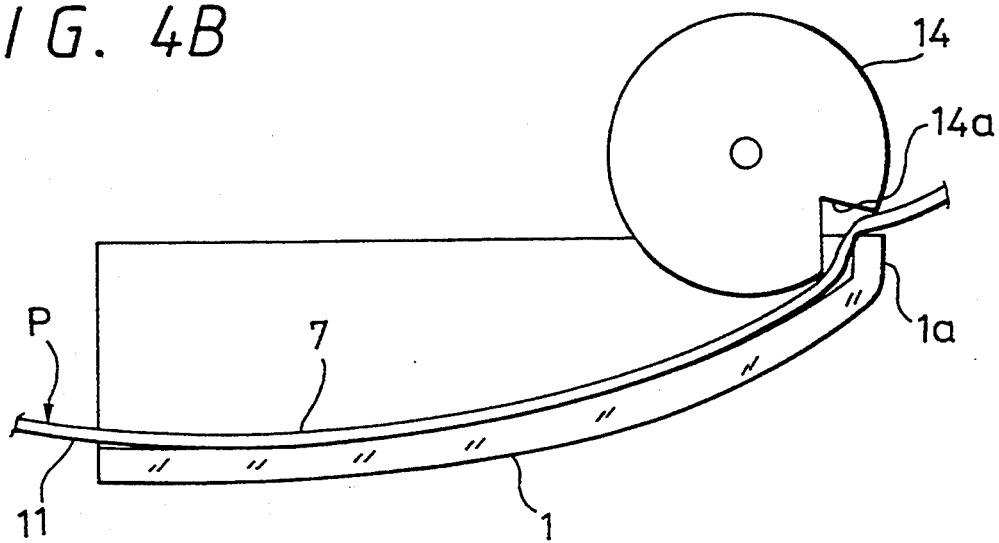

As shown in FIGS. 4A and 4B, the bonding layer 11 of the thermal transfer foil P is urged against the inner surface of the screen panel 1 by using a roller 14 that is heated to 200° C. by a heater (not shown) and then the roller 14 is rotated in the direction shown by an arrow R in FIG. 4A. Thus, the thermal transfer foil P is heated and the bonding layer 11 adheres to the screen panel 1 whereby the screen panel and the thermal transfer foil P are bonded together. The roller 14 has a recess 14a so that the thermal transfer foil P can be pressed and heated except at the skirt portion 1a of the screen panel 1.

According to this process, the stripping layer 8 of the thermal transfer foil P is dissolved and the base film 7 and the thermal transfer layer 12 are separated from each other. Accordingly, on the inner surface of the screen panel 1, there remains one portion of the bonding layer 11, the phosphor layer 10, the aluminum layer 9 and the stripping layer 8. Thereafter, the bonding layer 11 and the stripping layer 8 are removed by a predetermined baking process, whereby the phosphor screen 5 is formed on the inner surface of the screen panel 1.

According to an embodiment of the present invention, the phosphor screen 5 can be continuously formed by pressing and heating the thermal transfer foil P while the thermal transfer foil P is being moved. In this case, the position of the thermal transfer foil P can be determined by detecting the positioning means 13 on the base film 7 by a sensor (not shown).

As described above, according to this embodiment, since the aluminum layer 9 and the phosphor layer 10 are formed at the same time, the number of manufacturing processes can be reduced. Hence, the manufacturing cost can be reduced.

Also, since the intermediate layer need not be formed, unlike the example of the prior art, the aluminum layer 9 can be prevented from being stripped in the baking process and a satisfactory mirror surface can be obtained.

Furthermore, since the phosphor layer 10 is formed by screen process printing, the film thickness of the phosphor screen 5 can be controlled with ease.

While the present invention is applied to the transmissive type flat cathode ray tube as described above, the present invention is not limited thereto and may be applied to all single color cathode ray tubes such as a cathode ray tube for projector, a black and white cathode ray tube or the like. In particular, the present invention can be applied to the transmissive type flat cathode ray tube with remarkable effects being achieved.

As described above, according to the present invention, since the phosphor layer and the metal-backing layer can be formed simultaneously, the number of manufacturing processes can be reduced and the manufacturing cost can be reduced.

Further, since the intermediate layer provided between the phosphor layer and the metal-backing layer need not be formed, the metal-backing layer can be prevented from being stripped and a satisfactory mirror surface can be obtained.

Furthermore, since the phosphor layer can be formed by the printing method, the film thickness of the phosphor layer can be controlled with ease.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A thermal transfer composite material comprising:
   a base film;
   a stripping layer releasably adhered to said base film so as to be stripped therefrom;
   a metal-backing layer;
   a phosphor layer; and
   a bonding layer formed over said phosphor layer for adhesion to a surface, wherein said stripping layer is formed on said base film, said metal-backing layer is formed on said stripping layer, said phosphor layer is formed on said metal-backing layer and said bonding layer is formed on said phosphor layer, in that order,
   wherein said stripping layer is formed on said base film according to a gravure printing method by using an ink and said ink is composed of 10 parts by weight of acrylic resin, 45 parts by weight of toluene and 45 parts by weight of methylethyl ketone.

2. The thermal transfer composite material according to claim 1, wherein said base film is in the form of a strip substantially greater in length than in width and is made of polyethylene terephthalate.

3. The thermal transfer composite material according to claim 2, wherein said stripping layer, said metal-backing layer, said phosphor layer and said bonding layer constitute a thermal transfer layer for being thermally transferred to the surface from said base film.

4. The thermal transfer composite material according to claim 3, wherein a plurality of said thermal transfer layers are individually sequentially formed along a length of said strip of base film.

5. The thermal transfer composite material according to claim 4, further comprising a respective positioning element located on said base film strip for indicating a respective position of each of said plurality of thermal transfer layers formed thereon.

6. A thermal transfer composite material comprising:
   a base film;
   a stripping layer releasably adhered to said base film so as to be stripped therefrom;
   a metal-backing layer;
   a phosphor layer; and
   a bonding layer formed over said phosphor layer for adhesion to a surface, wherein said stripping layer is formed on said base film, said metal-backing layer is formed on said stripping layer, said phosphor layer is formed on said metal-backing layer and said bonding layer is formed on said phosphor layer, in that order,
   wherein said metal backing layer is an aluminum layer formed by vapor deposition and said phosphor layer is formed on said aluminum layer by a screen process printing method using a phosphor paste and said phosphor paste is composed of 20 parts by weight of acrylic resin, 20 parts by weight of phosphor powder ($Y_3O_6S$: Eu), 10 parts by weight of isophorone and 50 parts by weight of cyclohexanone.

7. The thermal transfer composite material according to claim 6, wherein said base film is in the form of a strip substantially greater in length than in width and is made of polyethylene terephthalate.

8. The thermal transfer composite material according to claim 7, wherein said stripping layer, said metal backing layer, said phosphor layer, and said bonding layer constitute a thermal transfer layer for being thermally transferred to the surface from said base film.

9. The thermal transfer composite material according to claim 8, wherein a plurality of said thermal transfer layers are individually sequentially formed along a length of said strip of base film.

10. The thermal transfer composite material according to claim 9, further comprising a respective positioning element located on said base film strip for indicating a respective position of each of said plurality of thermal transfer layers formed thereon.

11. A thermal transfer composite material comprising:
    a base film;
    a stripping layer releasably adhered to said base film so as to be stripped therefrom;
    a metal-backing layer;
    a phosphor layer; and
    a bonding layer formed over said phosphor layer for adhesion to a surface, wherein said stripping layer is formed on said base film, said metal-backing layer is formed on said stripping layer, said phosphor layer is formed on said metal-backing layer and said bonding layer is formed on said phosphor layer, in that order,
    wherein said bonding layer is formed on said phosphor layer by using an ink and said ink is composed of parts by weight of polyamide resin, 30 parts by weight of ethyl cellosolve and 40 parts by weight of cyclohexanone.

12. The thermal transfer composite material according to claim 11, wherein said base film is in the form of a strip substantially greater in length than in width and is made of polyethylene terephthalate.

13. The thermal transfer composite material according to claim 12, wherein said stripping layer said metal backing layer, said phosphor layer, and said bonding layer constitute a thermal transfer layer for being thermally transferred to the surface from said base film.

14. The thermal transfer composite material according to claim 13, wherein a plurality of said thermal transfer layers are individually sequentially formed along a length of said strip of base film.

15. The thermal transfer composite material according to claim 14, further comprising a respective positioning element located on said base film strip for indicating a respective position of each of said plurality of thermal transfer layers formed thereon.

* * * * *

UNITED STATES PATENT AND TRADEMARK OFFICE
CERTIFICATE OF CORRECTION

PATENT NO. : 5,418,075
DATED : May 23, 1995
INVENTOR(S) : Ichiro Utsumi It is certified that error appears in the above-identified patent and that said Letters Patent is hereby corrected as shown below:

```
In the Abstract, line 9, change "a" to --the--
Col. 1, line 15, change "tubes" to --tube--
        same line, after "triple" insert --structure--
Col. 3, line 31, delete ";"
Col. 4, line 38, after "1" insert --,--
        line 39, after "panel" insert --1--
```

<u>In the claims:</u>

Col. 6, line 60, after "of" first occurrence, insert --30--

Signed and Sealed this

Tenth Day of September, 1996

*Attest:*

BRUCE LEHMAN

*Attesting Officer*          *Commissioner of Patents and Trademarks*